US012715942B2

(12) United States Patent
Wan et al.

(10) Patent No.: US 12,715,942 B2
(45) Date of Patent: Aug. 25, 2026

(54) PHOTOCURABLE COMPOSITION

(71) Applicant: CANON KABUSHIKI KAISHA, Tokyo (JP)

(72) Inventors: Fen Wan, Austin, TX (US); Weijun Liu, Cedar Park, TX (US); Toshiki Ito, Kawasaki-city (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 18/603,291

(22) Filed: Mar. 13, 2024

(65) Prior Publication Data

US 2025/0289916 A1 Sep. 18, 2025

(51) Int. Cl.
*C08F 112/36* (2006.01)

(52) U.S. Cl.
CPC .................................. *C08F 112/36* (2013.01)

(58) Field of Classification Search
None
See application file for complete search history.

(56) References Cited

U.S. PATENT DOCUMENTS 8,404,797 B2 3/2013 Kawabe
8,728,708 B2 5/2014 Sakita et al.
10,061,196 B2 * 8/2018 Fujiki ........................ G03F 7/16
2008/0311483 A1 12/2008 Stockel
2017/0120515 A1 5/2017 Rolland et al.
2018/0174701 A1 6/2018 Kushida et al.
2018/0251646 A1 9/2018 Rolland
2020/0317956 A1 10/2020 Campbell
2022/0043342 A1 2/2022 Cardolaccia

FOREIGN PATENT DOCUMENTS

JP 2012208152 A * 10/2012

OTHER PUBLICATIONS

International Search Report dated Jun. 9, 2025, with regard to International Application No. PCT/US2025/016574, pp. 1-13.

* cited by examiner

*Primary Examiner* — Sanza L. McClendon
(74) *Attorney, Agent, or Firm* — Abel Schillinger, LLP

(57) ABSTRACT

A photocurable composition can comprise comprising a polymerizable material, a photoinitiator, and a photoacid generator, wherein the polymerizable material comprises at least one multi-functional vinylbenzene monomer in an amount of at least 10 wt % based on the total weight of the polymerizable material and the photoinitiator includes an oxime ester compound. The photocurable composition can be suitable for inkjet adaptive planarization (IAP) processing and the forming of photo-cured layers having a high thermal stability and low thermal shrinkage.

20 Claims, No Drawings

PHOTOCURABLE COMPOSITION

FIELD OF THE DISCLOSURE

The present disclosure relates to a photocurable composition, particularly to a photocurable composition adapted for inkjet adaptive planarization.

BACKGROUND

Inkjet Adaptive Planarization (IAP) is a process which planarizes a surface of a substrate, e.g., a wafer containing an electronic circuit, by jetting liquid drops of a curable composition on the surface of the substrate and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps.

Integrated circuit fabrication often involves hundreds of sequential process steps, of which IAP is a very critical and multiple used step. The curable composition used for IAP, often also called "IAP resist," needs to comply with a large property-profile, such as low viscosity (required by inkjet dispensing and filling the gaps), being free of impurities and particles, low evaporation to avoid material loss, a fast-curing speed, low separation force during removal of the superstrate, and good mechanical strength and high etch resistance after curing. It is further of high importance that the cured IAP resist has a high thermal stability and low shrinkage if exposed to high temperatures, because downstream processing often involves temperatures in the range of 350° C. up to 450° C. There exists a need for improved IAP materials leading to planar cured layers with high thermal stability.

SUMMARY

In one embodiment, a photocurable composition can comprise a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound.

In one aspect, the photoacid generator of the photocurable composition can comprise a structure selected from structure (1), structure (2), structure (3), or a combination thereof:

(1)

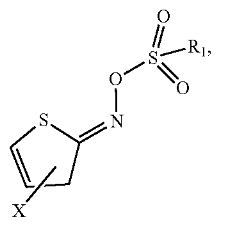

-continued (2)

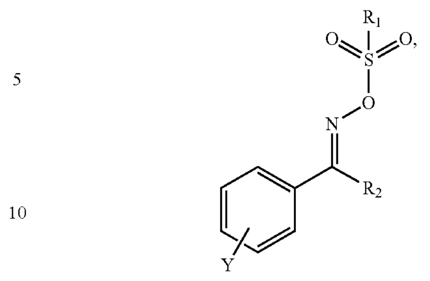

(3)

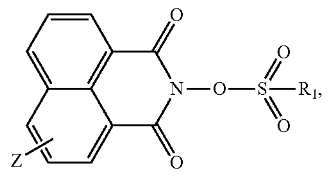

with X, Y, Z being substituted or unsubstituted alklyl or arylalkyl; $R_1$, $R_2$, being $C_1$-$C_{10}$ alkyl, or $C_1$-$C_5$-alkyl-aryl, or $C_nF_{(2n+1)}$ wherein n is 1 to 4.

In another aspect, after curing the photocurable composition to a solid layer, a material of the solid layer can have a TGA400 weight loss of not greater than 9 percent, the TGA400 weight loss being measured via thermogravimetry under nitrogen at a ramp rate of 20° C./min from 23° C. to 400° C. In a particular aspect, the TGA400 weight loss may be not greater than 5 percent.

In one embodiment of the photocurable composition, the oxime ester compound can have a structure of formula (9):

(9)

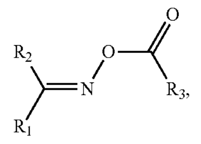

with $R_1$ being a substituted or unsubstituted aromatic ring system or a heteroaromatic ring system, $R_2$ being H or $C_1$-$C_8$ alkyl, $R_3$ being H or $C_1$-$C_8$ alkyl.

In a further embodiment of the photocurable composition, the amount of the photoacid generator can be at least 0.2 wt % and not greater than 2.0 wt % based on the total weight of the photocurable composition.

In another aspect of the photocurable composition, the amount of the photoinitiator can be at least 1 wt % and not greater than 6 wt % based on a total weight of the photocurable composition.

In yet a further aspect of the photocurable composition of claim 1, the excitation wavelength of the photoinitiator and the photoacid generator can be in a range of 350 nm to 400 nm.

In one aspect of the photocurable composition, the photoinitiator can further include a photoinitiator not being an oxime ester compound.

In another aspect of the photocurable composition, the amount of the polymerizable material can be at least 90 wt % based on the total weight of the photocurable composition.

In a further aspect, the multi-functional vinylbenzene monomer of the polymerizable material of the photocurable composition can include at least three vinyl groups. In a particular aspect, the multi-functional vinylbenzene monomer can be a biphenyl compound including three vinyl groups.

In a certain aspect of the photocurable composition, the polymerizable material may consist essentially of the multi-functional vinylbenzene monomer.

In yet a further aspect, the photocurable composition can further comprise a solvent in an amount of at least 1 wt % and not greater than 15% wt % based on the total weight of the photocurable composition.

In a further aspect, the viscosity of the photocurable composition may be not greater than 50 mPa·s.

In one embodiment, a laminate can comprise a substrate and a photo-cured layer overlying the substrate, wherein the photo-cured layer is formed from the above-described photocurable composition.

In another embodiment, a method of forming a photo-cured layer on a substrate can comprise: applying a layer of a photocurable composition on the substrate, wherein the photocurable composition comprises a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound; bringing the photocurable composition into contact with a template or a superstrate; irradiating the photocurable composition with light to form a photo-cured layer; and removing the template or the superstrate from the photo-cured layer.

In one aspect of the method, irradiating the photocurable composition can be conducted with UV light having a wavelength between 350 nm and 400 nm.

In another aspect of the method, the material of the photo-cured layer can have a TGA400 weight loss of not greater than 9 percent, the TGA400 weight loss being measured via thermogravimetry at a ramp rate of 20° C./min from 23° C. to 400° C.

In a further embodiment, a method of manufacturing an article can comprise: applying a layer of a photocurable composition on a substrate, wherein the photocurable composition comprises a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound; bringing the photocurable composition into contact with a template or a superstrate; irradiating the photocurable composition with light to form a photo-cured layer; removing the template or the superstrate from the photo-cured layer; forming a pattern on the substrate; processing the substrate on which the pattern has been formed in the forming; and manufacturing an article from the substrate processed in the processing.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material, a photoinitiator, and a photoacid generator, wherein the polymerizable material can comprises at least one multi-functional vinylbenzene monomer in an amount of at least 10 wt % based on the total weight of the polymerizable material; and the photoinitiator may include an oxime ester compound.

The photocurable composition of the present disclosure can have the advantage of being usable in inkjet adaptive planarization (IAP) processing by having a low viscosity, a high thermal stability after curing and low shrinkage if exposed to high temperatures.

In one aspect, the photoacid generator can be selected that it has an UV absorption peak in a wavelength range overlapping with an UV absorption peak of the oxime ester compound of the photoinitiator. In a particular aspect, both the photoacid generator and the photoinitiator can be excited within a wavelength range from 340 nm to 390 nm, which is herein also called excitation wavelength. In a certain aspect, the excitation wavelength can be from 350 nm to 380 nm.

In one embodiment, the photocurable composition of the present disclosure can be adapted that after curing the photocurable composition to a solid layer, a material of the solid layer can have a TGA400 weight loss of not greater than 9 percent, the TGA400 weight loss being measured via thermogravimetry under nitrogen at a ramp rate of 20° C./min from 23° C. to 400° C. In certain aspects, the TGA400 weight loss may be not greater than 7 percent, or not greater than 5 percent, or not greater than 3 percent, or not greater than 2 percent, or not greater than 1 percent.

In another embodiment, a photo-cured layer formed from the photocurable composition can have a linear shrinkage (herein also called "thermal shrinkage") after a baking treatment at 400° C. on a hot-plate of not greater than 9.5%, the baking treatment including 2 minutes baking of the photo-cured layer on a stainless steel plate having a temperature of 400° C. In further aspects, the linear shrinkage after the baking treatment at 400° C. may be not greater than 7.0%, not greater than 5.0%, not greater than 3.0%, not greater than 2.0%, or not greater than 1.0%, or not greater than 0.5%.

In one embodiment, the photoacid generator of the photocurable composition can be selected from the group of the following structures:

(1)

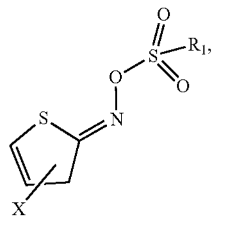

(2)

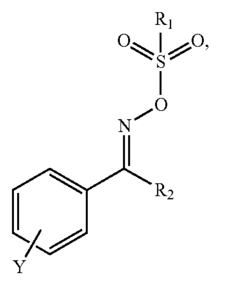

(3)

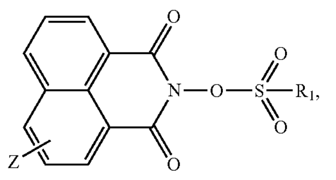

with X, Y, Z being substituted or unsubstituted alklyl or arylalkyl; $R_1$, $R_2$, being $C_1$-$C_{10}$ alkyl, or $C_1$-$C_5$-alkyl-aryl, or $C_nF_{(2n+1)}$ wherein n is 1 to 4.

In a particular embodiment, the photoacid generator can have structure (4):

(4)

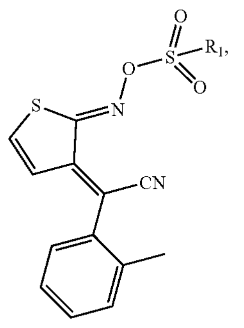

with $R_1$ being $C_1$-$C_{10}$ alkyl. In a certain particular embodiment, $R_1$ can be propyl (which structure is herein called "PAG 103"), or octyl, or tolyl.

In another certain aspect, the photoacid generator can have structure (5):

(5)

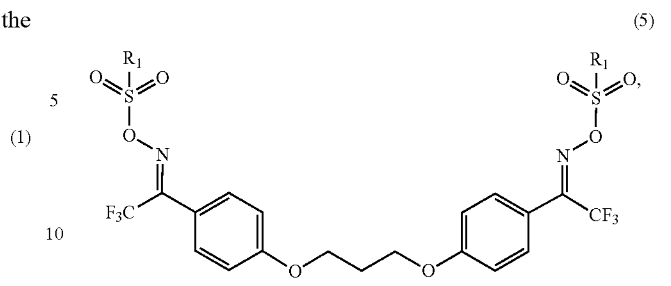

with $R_1$ being $C_1$-$C_{10}$ alkyl, in a certain particular aspect, $R_1$ can be propyl (which is structure is herein called PAG 203).

In yet a further aspect, the photoacid generator can have structure (6), (7), or (8).

(6)

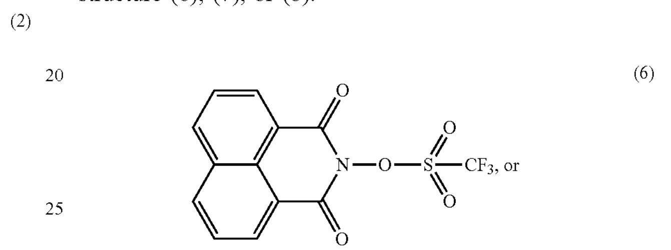

(7)

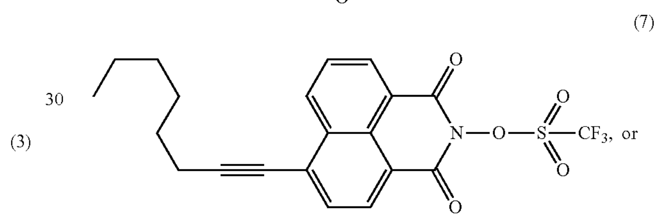

(8)

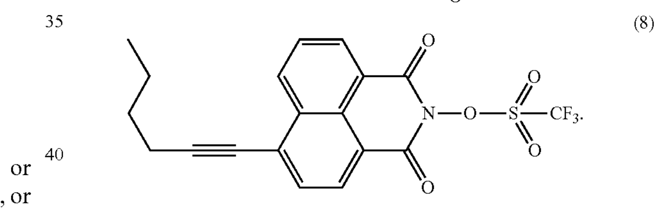

In one embodiment, the amount of the photoacid generator can be at least 0.2 wt % based on the total weight of the photocurable composition, or at least 0.5 wt %, or at least 0.7 wt %, or at least 1.0 wt %, or at least 1.5 wt %. In another aspect, the amount of the photoacid generator can be not greater than 5.0 wt % based on the total weight of the photocurable composition, or not greater than 4.0 wt %, or not greater than 3.0 wt %, or not greater than 2.0 wt %, or not greater than 1.7 wt %.

The photoinitiator can comprise an oxime ester compound having a structure of formula (9):

(9)

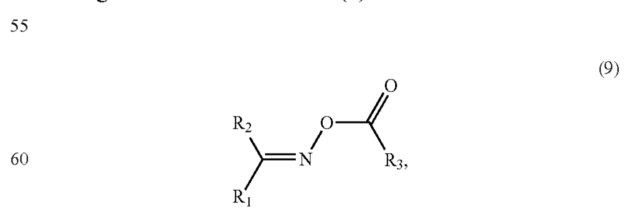

with $R_1$ being an aromatic ring system or a heteroaromatic ring system, $R_2$ being H or $C_1$-$C_8$ alkyl, $R_3$ being H or $C_1$-$C_8$ alkyl. The aromatic or heteroaromatic ring system $R_1$ can be substituted or unsubstituted.

In a particular embodiment, the oxime ester compound can have a structure of formula (10), (11), (12), or (13):

(10)

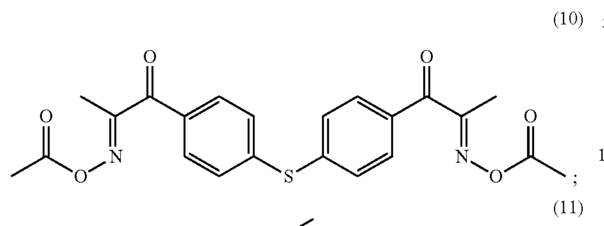

;

(11)

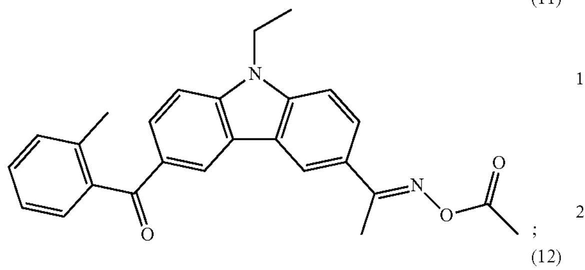

;

(12)

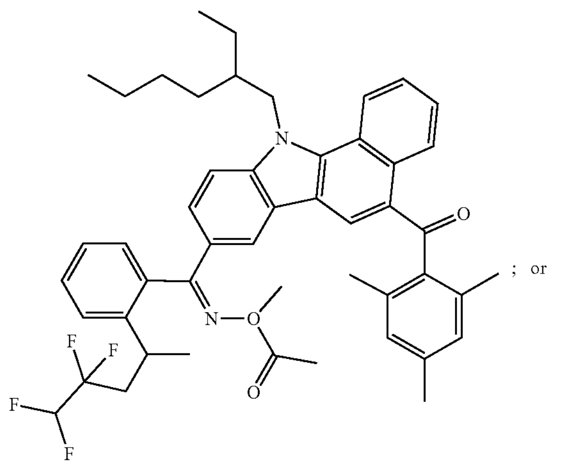

; or (13)

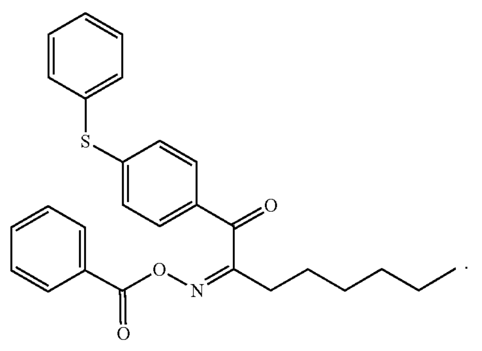

.

The amount of the oxime ester compound of the photoinitiator can be at least 0.5 wt % based on the total weight of the photocurable composition, or at least 1.0 wt %, or at least 1.5 wt %, or at least 2.0 wt %, or at least 2.5 wt %, or at least 3.0 wt %, or at least 3.5 wt %, or at least 4.0 wt %. In another aspect, the amount of the oxime ester compound may be not greater than 10 wt % based on the total weight of the photocurable composition, or not greater than 8 wt %, or not greater than 7 wt %, or not greater than 6 wt %, or not greater than 5 wt %, or not greater than 4 wt %. The amount of the oxime ester compound of the photoinitiator can be a value between any of the minimum and maximum numbers noted above.

In a certain aspect, the photoinitiator of the photocurable composition can further include at least one photoinitiator which is not an oxime ester compound.

The polymerizable material of the photocurable composition can be a major amount of the composition. In one embodiment, the amount of the polymerizable material can be at least 60 wt % based on the total weight of the photocurable composition, or at least 70 wt %, or at least 80 wt %, or at least 90 wt %, or at least 92 wt %, or at least 95 wt %. In another aspect, the amount of the polymerizable material may be not greater than 98 wt %, or not greater than 96 wt %, or not greater than 94 wt %, or not greater than 90 wt %, or not greater than 86 wt %.

As used herein, the term multi-functional vinylbenzene monomer of the polymerizable material relates to a polymerizable monomer comprising one or more benzene rings and at least two vinyl groups directly attached to the one or more benzene rings. In certain aspects, the multi-functional vinylbenzene monomer can comprise at least three vinyl groups or at least four vinyl groups. In a particular aspect, the multi-functional vinylbenzene monomer can comprise two benzene rings and three vinyl groups attached to the benzene rings. A non-limiting example of such monomer can be 3,4',5-trivinyl-1,1'biphenyl (3VPH).

In one embodiment, the amount of the multi-functional vinylbenzene monomer can be at least 10 wt % based on the total weight of the polymerizable material, or at least 20 wt %, or at least 30 wt %, or at least 35 wt %, at least 40 wt %, at least 50 wt %, at least 60 wt %, at least 70 wt %, at least 80 wt %, at least 90 wt %, or at least 95 wt %. In another aspect, all of the polymerizable material can be a multi-functional vinylbenzene monomer, or not greater than 98 wt % based on the total weight of the polymerizable material, or not greater than 95 wt %, or not greater than 90 wt %, or not greater than 80 wt %, or not greater than 70 wt %, or not greater than 60 wt %, or not greater than 50 wt %, or not greater than 40 wt %, or not greater than 30 wt %, or not greater than 20 wt %. The amount of the multi-functional vinylbenzene monomer can be a value between any of the minimum and maximum numbers noted above.

In other aspects, the polymerizable material can include next to the multi-functional vinylbenzene monomer one or more other types of polymerizable compounds, for example, mono-functional monomers, multi-functional monomers not being a vinylbenzene, polymerizable oligomers, or polymerizable polymers.

In a particular embodiment, the polymerizable material can further comprise a multi-functional acrylate monomer. In one aspect, the multi-functional acrylate monomer can include at least two acrylate groups, or at least three acrylate groups, or at least four acrylate groups. In another aspect, the multi-functional acrylate monomer can include at least one acrylate group and at least one vinyl group. As used herein, the term acrylate monomer relates to substituted and non-substituted acrylate monomers. Non-limiting examples of substituted acrylate monomers can be multi-functional $C_1$-$C_8$ alkylacrylates, for example, multi-functional methacrylates or ethylacrylates. Furthermore, as used herein, the term "vinyl group" does not relate to a vinyl group which is part of an acrylate group and is a functional group by itself.

In a particular aspect, the multi-functional acrylate monomer can include one acrylate group and two vinyl groups and an aromatic ring structure, for example, one or more benzene rings.

The amount of the multi-functional acrylate monomer can be at least 10 wt % based on the total weight of the polymerizable material, or at least 20 wt %, or at least 30 wt %, or at least 40 wt %, or at least 50 wt %, or at least 60 wt %. In another aspect, the amount of the multi-functional acrylate monomer may be not greater than 70 wt % based on the total weight of the polymerizable material, or not greater than 60 wt %, or not greater than 50 wt %. The amount of the multi-functional acrylate monomer can be a value between any of the minimum and maximum numbers noted above.

In a particular aspect, the photocurable composition can be essentially free of a maleimide monomer. Essentially free of a maleimide monomer means herein that not more than 0.5 wt % of the polymerizable material may be a maleimide monomer. In another aspect, the photocurable composition can be free of a maleimide monomer.

In another particular aspect, the photocurable composition can be essentially free of an epoxy-group containing monomer (epoxy monomer). As used herein, essentially free of an epoxy monomer means that not more than 0.5 wt % of the polymerizable material may be an epoxy monomer. In another aspect, the photocurable composition can be free of an epoxy monomer.

In yet a further particular aspect, the photocurable composition can be essentially free of an amine-group containing monomer (amine monomer). As used herein, essentially free of amine monomer means that not more than 0.5 wt % of the polymerizable material may be an amine monomer. In another aspect, the photocurable composition can be free of an amine monomer.

In order to stabilize the multi-functional vinylbenzene monomer in the photocurable composition (preventing unwanted polymerization during storage), a suitable stabilizer can be added to the composition. In one aspect, the photocurable composition can include 4-tert-butylcatechol (TBC) as a stabilizer in an amount of at least 0.05 wt % based on the total weight of the photocurable composition. In certain aspects, the amount of TBC can be at least 0.1 wt % based on the total weight of the photocurable composition, or at least 0.2 wt %, or at least 0.3 wt %. In another aspect, the amount of TBC may be not greater than 1.0 wt % based on the total weight of the photocurable composition, or not greater than 0.5 wt %, or not greater than 0.3 wt %, or not greater than 0.2 wt %.

In a certain embodiment, the photocurable composition of the present disclosure can be essentially free of a solvent.

As used herein, if not indicated otherwise, the term solvent relates to a compound which can dissolve or disperse the polymerizable monomers but does not itself polymerize during the photo-curing of the photocurable composition. The term "essentially free of a solvent" means herein an amount of solvent being not greater than 5 wt % based on the total weight of the photocurable composition. In a certain particular aspect, the amount of a solvent can be not greater than 3 wt %, not greater than 2 wt %, not greater than 1 wt %, or the photocurable composition can be free of a solvent, except for unavoidable impurities.

In another aspect, the photocurable composition and the present disclosure can comprise a solvent in an amount higher than 5 wt % based on the total weight of the photocurable composition. In a particular aspect, the amount of solvent can be at least 7 wt % based on the total weight of the photocurable composition, or at least 10 wt %, or at least 15 wt %, at least 20 wt %, or at least 25 wt %. In another aspect, the amount of solvent may be not greater than 40 wt %, or not greater than 30 wt %, or not greater than 20 wt %, or not greater than 15 wt %, or not greater than 10 wt % based on the total weight of the photocurable composition.

In one embodiment, the curable composition of the present disclosure can have a low viscosity which may allow the use of these compositions in IAP applications. In one aspect, the viscosity of the curable composition at a temperature of 23° C. can be not greater than 50 mPa·s, such as not greater than 40 mPa·s, or not greater than 30 mPa·s, not greater than 20 mPa·s, not greater than 15 mPa·s, or not greater than 10 mPa·s. In another aspect, the viscosity may be at least 5 mPa·s, or at least 7 mPa·s. As used herein, all viscosity values relate to viscosities measured at a given temperature with the Brookfield method.

In a further aspect, the photocurable composition can contain at least one optional additive. Non-limiting examples of optional additives can be surfactants, dispersants, stabilizer, co-solvents, initiators, inhibitors, dyes, or any combination thereof.

In another aspect, the photocurable composition of the present disclosure can be essentially free of particles, for example being essentially free of pigment particles. As used herein, being essentially free of particles means that the curable composition contains not more than 50 particles per ml having a size of 200 nm or greater, or not more than 50 particles per ml having a size of 150 nm or greater, or not more than 50 particles per ml having a size of 100 nm or greater, or not more than 50 particles per ml having a size of 30 nm or greater, or not more than 50 particles per ml having a size of 15 nm or greater.

In yet a further embodiment, the photocurable composition of the present disclosure may be essentially free of epoxy-group containing oligomers, or an acrylamide polymer, or a polyurethane. Being essentially free of these oligomers or polymers means herein that the photocurable composition does not contain more than 0.5 wt % of such oligomers or polymers.

In another embodiment, the present disclosure is directed to a laminate comprising a substrate and a photo-cured layer overlying the substrate, wherein the photo-cured layer can be formed from the photocurable composition described above.

In a certain aspect, the laminate can further include one or more layers between the substrate and the cured layer, for example an adhesion layer.

The present disclosure is further directed to a method of forming a photo-cured layer. The method can comprise applying the photocurable composition described above on a substrate; bringing the photocurable composition into contact with a template or superstrate; irradiating the photocurable composition with light to form the photo-cured layer; and removing the template or superstrate from the photo-cured layer.

In one aspect, the light irradiation can be conducted with light having a wavelength between 250 nm to 760 nm. In a preferred aspect, the light irradiation may be conducted with light having a wavelength between 340 nm and 390 nm.

The substrate and the solidified (photo-cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly found that photocurable compositions including certain combinations of an oxime ester compound, a photoacid generator and multi-functional vinylbenzene as part of the polymerizable material can be very suitable for IAP processing. It could be shown that the presence of a photoacid generator could improve the heat stability of the photo-cured layers formed from the photocurable compositions. It was possible to balance parameters important for IAP processing, such as a low viscosity, fast curing speed, and high heat stability after curing, which makes these materials suitable for downstream processing at high temperatures, such as 350° C., or 400° C., or even 450° C.

EXAMPLES

The following non-limiting examples illustrate the concepts as described herein.

Example 1

Preparing of Photocurable IAP Compositions

A first set of photocurable compositions (samples S1 to S4) was prepared comprising 100 parts by weight 3,3'-divinylbiphenyl (DVBPH), 1 part by weight of nonionic fluorosurfactant FS 3100 (from Dupont), 2 parts by weight of oxime ester photoinitiator Omnirad 1316 (from IGM Resins USA Inc.), see structure (10), 4 parts of photoinitiator Irgacure 651 (from IGM Resins USA Inc.), and varying amounts of the photoacid generators PAG103 (from BASF), which corresponds to structure (4) with $R_1$ being propyl; and PAG203 (from BASF), which corresponds to structure (5), with $R_1$ being propyl.

Comparative composition C1 was made which did not contain a photoacid generator but all other ingredients of compositions S1, S2, S3, and S4.

A summary of the first set of photocurable compositions is shown in Table 1.

TABLE 1

| | S1 | S2 | S3 | S4 | C1 |
|---|---|---|---|---|---|
| DVBPH | 100 | 100 | 100 | 100 | 100 |
| FS3100 | 1 | 1 | 1 | 1 | 1 |
| Oxime Ester Photoinitiator 1316 | 2 | 2 | 2 | 2 | 2 |
| Irgacure 651 | 4 | 4 | 4 | 4 | 4 |
| Photoacid Generator PAG103 | 1 | | | 2 | |
| Photoacid Generator PAG203 | | 1 | 2 | | |
| Viscosity [mPa · s] | 16 | 16 | 17 | 17 | 16 |

A second set of photocurable compositions (samples S5 to S8) was prepared by combining the following ingredients: 50 parts by weight DVBPH, 50 parts by weight 3,4',5-trivinyl-1,1'-biphenyl (3VPH), 2 parts by weight of oxime ester photoinitiator Omnirad 1316, 4 parts of photoinitiator Irgacure 651, and varying amounts of the photoacid generators PAG103 and PAG203. Comparative composition C2 did not contain any photoacid generator. A summary of the second set of photocurable compositions can be seen in Table 2.

TABLE 2

| | S5 | S6 | S7 | S8 | C2 |
|---|---|---|---|---|---|
| DVBPH | 50 | 50 | 50 | 50 | 50 |
| 3VPH | 50 | 50 | 50 | 50 | 50 |
| FS3100 | 1 | 1 | 1 | 1 | 1 |
| Oxime Ester Initiator 1316 | 2 | 2 | 2 | 2 | 2 |
| Irgacure 651 | 4 | 4 | 4 | 4 | 4 |
| Photoacid Generator PAG103 | 1 | 0.5 | | | |
| Photoacid Generator PAG203 | | | 1 | 2 | |
| Viscosity [mPa · s] | 30 | 30 | 30 | 31 | 30 |

Example 2

Thermal Shrinkage

The thermal shrinkage was determined according to the following procedure:

First, a UV-cured layer was prepared by depositing an about 500 nm thick liquid film of the photocurable composition unto a blank fused silica template. The liquid film was radiated with UV light having a wavelength of 365 nm and a light intensity of 38 $mW/cm^2$, with a total of curing energy dosage of 5 $J/cm^2$ or 20 $J/cm^2$, depending on the composition type. The UV radiation was conducted using a DYMAX Bluewave AX-550 curing system.

The photo-cured films were subjected to a high temperature baking treatment by placing the UV-cured film for two minutes on a hot plate regulated to a defined temperature (350° C. or 400° C.) under nitrogen. The thickness of the film before and after the baking was measured with a JA Woollam Spectroscopic Ellipsometer M-2000 X-210. The thermal shrinkage (St) was calculated according to the equation: $St=[(T_u-T_b)/T_u]\times 100\%$, with $T_u$ being the thickness of the photo-cured film before the baking, $T_b$ being the thickness of the film after baking.

The measured thermal shrinkage values are summarized in Tables 3 and 4.

Table 3 shows shrinkage data of photo-cured layers which were cured with a radiation energy of 20 $J/cm^2$, and placed after the curing on a 350° C. heated hot-plate for two minutes under nitrogen. It can be seen that photocurable compositions containing the photoacid generators TAG103 (Samples S1 and S3) or TAG203 (sample S2) formed solid layers which had a better high temperature stability after the baking treatment than comparative sample C1 which did not contain a photoacid generator in the photocurable composition. The shrinkage could be reduced from 4.15% (sample C1) down to 3.15% (Sample S1). It is interesting that the lower concentration of 1 wt % TAG103 obtained a lower shrinkage that an amount of 2 wt % TAG103, see sample S3, with about 3.6% shrinkage. It can be further seen that photoacid generator TAG103 was more efficient than photoacid generator TAG203 for reducing the shrinkage when using the same concentration of 1 wt %.

Not being bound to theory, it is assumed that the photoacid generator, which was selected to be excited together with the oxime ester photoinitiator by the same light source (radiation wavelength of 365 nm), may reduce the activation energy of the photoinitiator and enhance the electron transferring of the excited radicals, and thereby cause a higher degree of cross-linking/polymerization between the polymerizable monomers.

TABLE 3

| | Sample | | | |
|---|---|---|---|---|
| | C1 | S1 | S2 | S3 |
| TAG103 [wt %] | | 1 | | 2 |
| TAG203 [wt %] | | | 1 | |
| DVBPH [wt %] | 100 | 100 | 100 | 100 |
| Thermal Shrinkage [%] | 4.15 | 3.15 | 3.75 | 3.6 |

Thermal shrinkage data of photo-cured layers after a baking treatment at a temperature of 400° C. can be seen in Table 4. The photo-cured layers used for these baking treatment had been formed by curing with a radiation energy of 5 J/cm$^2$. It can be seen that photo-cured layers made from photocurable compositions containing photoacid generator TAG103 reduced the shrinkage in comparison to comparative composition C2 which did not contain a photoacid generator. It was interesting to observe that also here, the lower concentration of 0.5 wt % TAG103, led to the lowest shrinkage of 5.5%, in comparison to 5.85% shrinkage at a concentration of 1 wt % of TAG103. The shrinkage of comparative composition C2 was 6.2%.

TABLE 4

| | Sample | | |
|---|---|---|---|
| | C2 | S5 | S6 |
| TAG103[wt %] | | 1 | 0.5 |
| DVBPH [wt %] | 50 | 50 | 50 |
| 3VPH [wt %] | 50 | 50 | 50 |
| Thermal Shrinkage [%] | 6.2 | 5.85 | 5.50 |

Example 3

Dynamic Thermogravimetry

The thermal stability of the photo-cured layers was further investigated via dynamic thermal gravimetric analysis (TGA) using a LINSEIS STA PT1000 instrument (Linseis Messgeraete GmbH, Germany). All measurements were conducted under nitrogen at a rate of 5 liter per hour.

For the TGA measurements, 25-35 mg of the photo-cured sample was placed in a crucible and the initial weight recorded. A reference crucible was used to monitor the weight change of the crucible due to the variation of the temperature. The sample was heated at a rate of 20° C./min and the weight loss of the sample with increasing temperature was recorded at intervals of 1 second. The relative weight percent change was calculated by using the weight loss divided by the total original weight of the sample.

The weight loss during the TGA measurements when reaching a temperature at 350° C., 400° C. and 450° C. is shown for several samples in Table 5.

TABLE 5

| | C1 | S1 | S3 | S4 | C2 | S5 | S6 |
|---|---|---|---|---|---|---|---|
| TAG103 [wt %] | | 1 | | 2 | | 1 | 0.5 |
| TAG203 [wt %] | | | 2 | | | | |
| DVBPH [wt %] | 100 | 100 | 100 | 100 | 50 | 50 | 50 |
| 3VPH [wt %] | | | | | 50 | 50 | 50 |
| 350° C. | −5.57 | −5.19 | −4.96 | −3.30 | | | |
| 400° C. | −9.21 | −8.32 | −6.57 | −6.56 | −0.91 | −0.85 | −0.34 |
| 450° C. | | | | | −3.08 | −2.42 | −1.58 |

It can be seen that adding the photoacid generator TAG103 or TAG203 to the photocurable compositions increased the temperature stability of the photo-cured layers. An especially high temperature stability up to 400° C. and 450° C. could be obtained when using as polymerizable material the combination of DVBPH and 3VPH, see samples S5 and S6. It could be further observed, as in Example 2, that a low amount of 0.5 wt % TAG103 had the best influence on the thermal stability in comparison to 1 wt % TAG103.

Example 4

Investigation of Double Bond Conversion

Fourier-transform infrared spectroscopy (FTIR) was conducted to measure the double bond conversion after a defined UV-curing regime of samples S2, S4, and S8 and comparative samples C1 and C2 (see compositions described in Example 1). For the measurements, the decrease of the peak for the double bond C═C in the IR spectrum at 989 cm$^{-1}$ (C═C bending peak) was measured before and after the curing, while the peak for the C—H benzene ring vibration at 713 cm$^{-1}$ was used as internal reference. A Thermo Nicolet 6700 FTIR with DTGS TEC detector was used to record the FTIR spectra from 4000 cm$^{-1}$ to 625 cm$^{-1}$.

For the measurement a sample amount of 0.2 μl was dropped on a NaCl window (25 mm×25 mm) and thereafter covered with another NaCl window of the same size. The applied UV light intensity was 38 mW/cm$^2$ for a time of 132 seconds, which corresponds to a dosage of 5 J/cm$^2$. The C═C conversion was calculated by the peak ratio of the cured sample (after exposure to the curing regime) to the uncured sample (at beginning of measurement, before UV exposure).

Table 6 provides a summary of the measured C═C conversion for the tested samples. It can be seen that when a photoacid generator was added to the photocurable compositions, the C═C conversion during post-curing was higher. Not being bound to theory, it is assumed that the presence of the photoacid generator influences the forming of a higher amount of cross-linking points (covalent bonds), which is also responsible for the higher thermal stability.

TABLE 6

| | Sample | | | | |
|---|---|---|---|---|---|
| | C1 | S2 | S4 | C2 | S8 |
| TAG103 [wt %] | | | 2 | | |
| TAG203 [wt %] | | 1 | | | 2 |
| DVBPH [wt %] | 100 | 100 | 100 | 50 | 50 |
| 3VPH [wt %] | | | | 50 | 50 |
| C═C Conversion[%] | 59.8 | 60.5 | 61.6 | 46.5 | 47.7 |

Viscosities

The viscosities of the photocurable compositions were measured using a Brookfield Viscometer LVDV-II+Pro at 200 rpm, with a spindle size #18 and a spin speed of 135 rpm. For the viscosity testing, about 6-7 mL of sample liquid was added into the sample chamber, enough to cover the spindle head. The sample contained in the chamber was about 20 minutes equilibrated to reach the desired measuring temperature of 23° C. before the actual measurement was started. For all viscosity testing, at least three measurements were conducted and an average value was calculated.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound.

2. The photocurable composition of claim 1, wherein the photoacid generator comprises a structure selected from a structure (1), a structure (2), a structure (3), or a combination thereof:

(1)

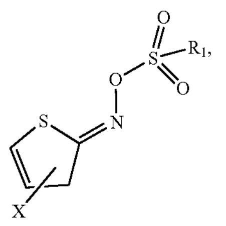

(2)

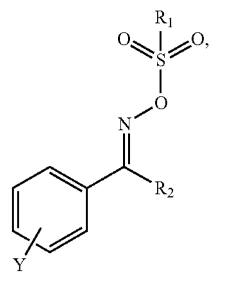

-continued (3)

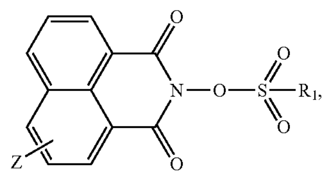

with X, Y, Z being substituted or unsubstituted alkyl or arylalkyl; $R_1$, $R_2$, being $C_1$-$C_{10}$ alkyl, or $C_1$-$C_5$-alkyl-aryl, or $C_nF_{(2n+1)}$ wherein n is 1 to 4.

3. The photocurable composition of claim 1, wherein after curing the photocurable composition to a solid layer, a material of the solid layer has a TGA400 weight loss of not greater than 9 percent, the TGA400 weight loss being measured via thermogravimetry under nitrogen at a ramp rate of 20° C./min from 23° C. to 400° C.

4. The photocurable composition of claim 3, wherein the TGA400 weight loss is not greater than 5 percent.

5. The photocurable composition of claim 1, wherein the oxime ester compound has a structure of formula (9):

(9)

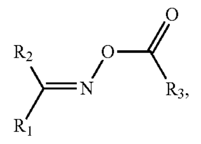

with $R_1$ being a substituted aromatic ring system or a heteroaromatic ring system, $R_2$ being H or $C_1$-$C_8$ alkyl, $R_3$ being H or $C_1$-$C_8$ alkyl.

6. The photocurable composition of claim 1, wherein an amount of the photoacid generator is at least 0.2 wt % and not greater than 2.0 wt % based on the total weight of the photocurable composition.

7. The photocurable composition of claim 1, wherein an amount of the photoinitiator is at least 1 wt % and not greater than 6 wt % based on a total weight of the photocurable composition.

8. The photocurable composition of claim 1, wherein an excitation wavelength of the photoinitiator and the photoacid generator is in a range of 350 nm to 400 nm.

9. The photocurable composition of claim 1, wherein the photoinitiator further includes a photoinitiator not being an oxime ester compound.

10. The photocurable composition of claim 1, wherein an amount of the polymerizable material is at least 90 wt % based on the total weight of the photocurable composition.

11. The photocurable composition of claim 1, wherein the multi-functional vinylbenzene monomer includes at least three vinyl groups.

12. The photocurable composition of claim 11, wherein the multi-functional vinylbenzene monomer is a biphenyl compound including three vinyl groups.

13. The photocurable composition of claim 1, wherein the polymerizable material consists essentially of the multi-functional vinylbenzene monomer.

14. The photocurable composition of claim 1, wherein the photocurable composition further comprises a solvent in an amount of at least 1 wt % and not greater than 15% wt % based on the total weight of the photocurable composition.

15. The photocurable composition of claim 1, wherein a viscosity of the photocurable composition is not greater than 50 mPa·s.

16. A laminate comprising a substrate and a photo-cured layer overlying the substrate, wherein the photo-cured layer is formed from the photocurable composition of claim 1.

17. A method of forming a photo-cured layer on a substrate, comprising:

applying a layer of a photocurable composition on the substrate, wherein the photocurable composition comprises a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound;

bringing the photocurable composition into contact with a template or a superstrate;

irradiating the photocurable composition with light to form a photo-cured layer; and removing the template or the superstrate from the photo-cured layer.

18. The method of claim 17, wherein irradiating the photocurable composition is conducted with UV light having a wavelength between 350 nm and 400 nm.

19. The method of claim 17, wherein a material of the photo-cured layer has a TGA400 weight loss of not greater than 9 percent, the TGA400 weight loss being measured via thermogravimetry at a ramp rate of 20° C./min from 23° C. to 400° C.

20. A method of manufacturing an article, comprising:

applying a layer of a photocurable composition on a substrate, wherein the photocurable composition comprises a polymerizable material, a photoinitiator, and a photoacid generator, wherein the polymerizable material comprises at least one multi-functional vinylbenzene monomer in an amount of at least 10 wt % based on the total weight of the polymerizable material; and the photoinitiator includes an oxime ester compound;

bringing the photocurable composition into contact with a template or a superstrate;

irradiating the photocurable composition with light to form a photo-cured layer;

removing the template or the superstrate from the photo-cured layer;

forming a pattern on the substrate;

processing the substrate on which the pattern has been formed in the forming; and manufacturing an article from the substrate processed in the processing.

* * * * *